(12) United States Patent
Halalay et al.

(10) Patent No.: US 9,023,520 B2
(45) Date of Patent: May 5, 2015

(54) LITHIUM ION BATTERY

(75) Inventors: Ion C. Halalay, Grosse Pointe Park, MI (US); Timothy J. Fuller, Pittsford, NY (US); Lijun Zou, Rochester, NY (US); Zicheng Li, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 13/348,977

(22) Filed: Jan. 12, 2012

(65) Prior Publication Data

US 2013/0183582 A1    Jul. 18, 2013

Related U.S. Application Data

(60) Provisional application No. 61/432,084, filed on Jan. 12, 2011.

(51) Int. Cl.
| | |
|---|---|
| H01M 4/26 | (2006.01) |
| H01M 2/16 | (2006.01) |
| H01M 4/62 | (2006.01) |
| H01M 10/0525 | (2010.01) |
| H01M 4/13 | (2010.01) |

(52) U.S. Cl.
CPC ........ *H01M 10/0525* (2013.01); *H01M 2/1653* (2013.01); *H01M 2/1686* (2013.01); *H01M 4/13* (2013.01); *H01M 4/62* (2013.01); *Y02E 60/122* (2013.01); *Y10T 29/49108* (2015.01); *Y10T 29/49115* (2015.01)

(58) Field of Classification Search
USPC ................................................ 429/212, 248
See application file for complete search history.

(56) References Cited

U.S. PATENT DOCUMENTS

| | | | |
|---|---|---|---|
| 5,130,211 A | 7/1992 | Wilkinson | |
| 6,689,513 B1* | 2/2004 | Morigaki et al. | ........ 429/231.95 |
| 7,022,812 B2 | 4/2006 | Yoshimura et al. | |
| 7,282,109 B2 | 10/2007 | Takata et al. | |
| 2010/0239900 A1* | 9/2010 | Take et al. | ..................... 429/144 |
| 2011/0117413 A1* | 5/2011 | Wang et al. | ................... 429/129 |
| 2011/0151333 A1 | 6/2011 | Halalay et al. | |

OTHER PUBLICATIONS

Walkowiak, et al., Macrocycle Carriers for Separation of Metal Ions in Liquid Membrane Process—A Review, Desalination 240, 1999, pp. 186-197.

Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

(Continued)

*Primary Examiner* — Jonathan Jelsma
*Assistant Examiner* — Rashid Alam
(74) *Attorney, Agent, or Firm* — Dierker & Associates, P.C.

(57) ABSTRACT

A lithium ion battery includes a positive electrode, a negative electrode, a microporous polymer separator disposed between the negative electrode and the positive electrode, and a polymer having a chelating agent tethered thereto. The polymer is incorporated into the lithium ion battery such that the chelating agent complexes with metal cations in a manner sufficient to not affect movement of lithium ions across the microporous polymer separator during operation of the lithium ion battery.

15 Claims, 4 Drawing Sheets

(56) References Cited

OTHER PUBLICATIONS

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

* cited by examiner

LITHIUM ION BATTERY

CROSS REFERENCE TO RELATED APPLICATION

This application claims the benefit of U.S. Provisional Patent Application Ser. No. 61/432,084 filed Jan. 12, 2011.

TECHNICAL FIELD

The present disclosure relates generally to lithium ion batteries.

BACKGROUND

Secondary, or rechargeable, lithium ion batteries are often used in many stationary and portable devices such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use.

A lithium ion battery generally operates by reversibly passing lithium ions between a negative electrode (sometimes called the anode) and a positive electrode (sometimes called the cathode). The negative and positive electrodes are situated on opposite sides of a microporous polymer separator that is soaked with an electrolyte solution suitable for conducting lithium ions. Each of the negative and positive electrodes is also accommodated by a current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium metal at a lower energy state than the intercalation host material of the negative electrode. The electrolyte solution may contain a lithium salt dissolved in a non-aqueous solvent.

A lithium ion battery, or a plurality of lithium ion batteries that are connected in series or in parallel, can be utilized to reversibly supply power to an associated load device. A brief discussion of a single power cycle beginning with battery discharge can be insightful on this point.

To begin, during discharge, the negative electrode of a lithium ion battery contains a high concentration of intercalated lithium while the positive electrode is relatively depleted. The establishment of a closed external circuit between the negative and positive electrodes under such circumstances causes the extraction of intercalated lithium from the negative anode. The extracted lithium atoms are then split into lithium ions and electrons. The lithium ions are carried through the micropores of the interjacent polymer separator from the negative electrode to the positive electrode by the ionically conductive electrolyte solution while, at the same time, the electrons are transmitted through the external circuit from the negative electrode to the positive electrode (with the help of the current collectors) to balance the overall electrochemical cell. This flow of electrons through the external circuit can be harnessed and fed to a load device until the level of intercalated lithium in the negative electrode falls below a workable level or the need for power ceases.

The lithium ion battery may be recharged after a partial or full discharge of its available capacity. To charge or re-power the lithium ion battery, an external power source is connected to the positive and the negative electrodes to drive the reverse of battery discharge electrochemical reactions. That is, during charging, the external power source extracts the intercalated lithium present in the positive electrode to produce lithium ions and electrons. The lithium ions are carried back through the separator by the electrolyte solution and the electrons are driven back through the external circuit, both towards the negative electrode. The lithium ions and electrons are ultimately reunited at the negative electrode thus replenishing it with intercalated lithium for future battery discharge.

The ability of lithium ion batteries to undergo such repeated power cycling over their useful lifetimes makes them an attractive and dependable power source. But lithium ion battery technology is constantly in need of innovative developments and contributions that can help to advance this and other related fields of technological art.

SUMMARY

A lithium ion battery is disclosed herein. The lithium ion battery includes a positive electrode, a negative electrode, a microporous polymer separator disposed between the negative electrode and the positive electrode, and a polymer having a chelating agent tethered thereto. The polymer is incorporated into the lithium ion battery such that the chelating agent complexes with metal cations in a manner sufficient to not affect movement of lithium ions across the microporous polymer separator during operation of the lithium ion battery.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

A lithium ion battery can suffer cumulative capacity reductions and other effects, such as the reduction of solvent molecules, when destructive metal cations are introduced into its various components. For instance, the negative electrode of the battery can be poisoned by metal cations that have dissolved from the positive electrode. In an example, a graphite electrode can be poisoned by $Mn^{+2}$ cations that dissolve from spinel $Mn_2O_4$ of the positive electrode, migrate through the battery electrolyte, and deposit onto the graphite. When deposited onto the graphite, the $Mn^{+2}$ cations become Mn atoms. Without being bound to any theory, it is believed that a small amount (e.g., 1 ppm) of Mn atoms can poison the graphite electrode, and this may prevent reversible electrode operation and thus the useful life of the battery. In another example, $Co^{+2}$ cations may dissolve from layered $LiCoO_2$ material of the positive electrode, which may be due, at least in part, to chemicals in the adhesive of the battery packaging. In yet another example, $Fe^{+2}$ cations from $LiFePO_4$ material of the positive electrode, which may be due, at least in part, to the presence of HF produced through the ingress of water into the battery electrolyte. In some cases, the concentration of the metal cations (e.g., the $Co^{+2}$, $Fe^{+2}$, $Mn^{+2}$, $Ni^{+2}$, etc.) in the battery may be low, and thus the dissolution may occur over a relatively long period of time (e.g., on the order of years).

Examples of the lithium ion battery as disclosed herein advantageously reduces or even prevents the poisoning of the negative electrode by transition metal cations (e.g., $Mn^{+2}$, $Co^{+2}$, etc.) that may become present in the electrolyte solution over the life of the battery. The battery includes a polymer having one or more chelating agents tethered thereto. The polymer is incorporated into the battery such that the chelating agent(s) complexes with the unwanted metal cations in a manner sufficient to not affect movement of lithium ions across a microporous polymer separator during operation of the battery. In an example, the chelating agents are chosen to selectively complex with the unwanted metal cations, for example, by immobilizing the metal cations that may dissolve into the electrolyte solution from the positive electrode (e.g., $Co^{+2}$, $Fe^{+2}$, $Mn^{+2}$, etc.). The chelating agent(s) thus operate as metal cation scavenger molecules that trap and immobilize the unwanted metal cations to prevent the migration of those metal cations through the electrolyte solution and to the negative electrode. It is to be understood that the chelating agents do not strongly complex with lithium ions (e.g., a single trapping site out of each one hundred sites are occupied by a Li cation compared to a Mn cation), and thus does not adversely affect the movement of lithium ions between the negative and positive electrodes to the point where an uncharacteristic reduction of the expected electrical current to be supplied by the battery occurs during discharge.

Figure 1:
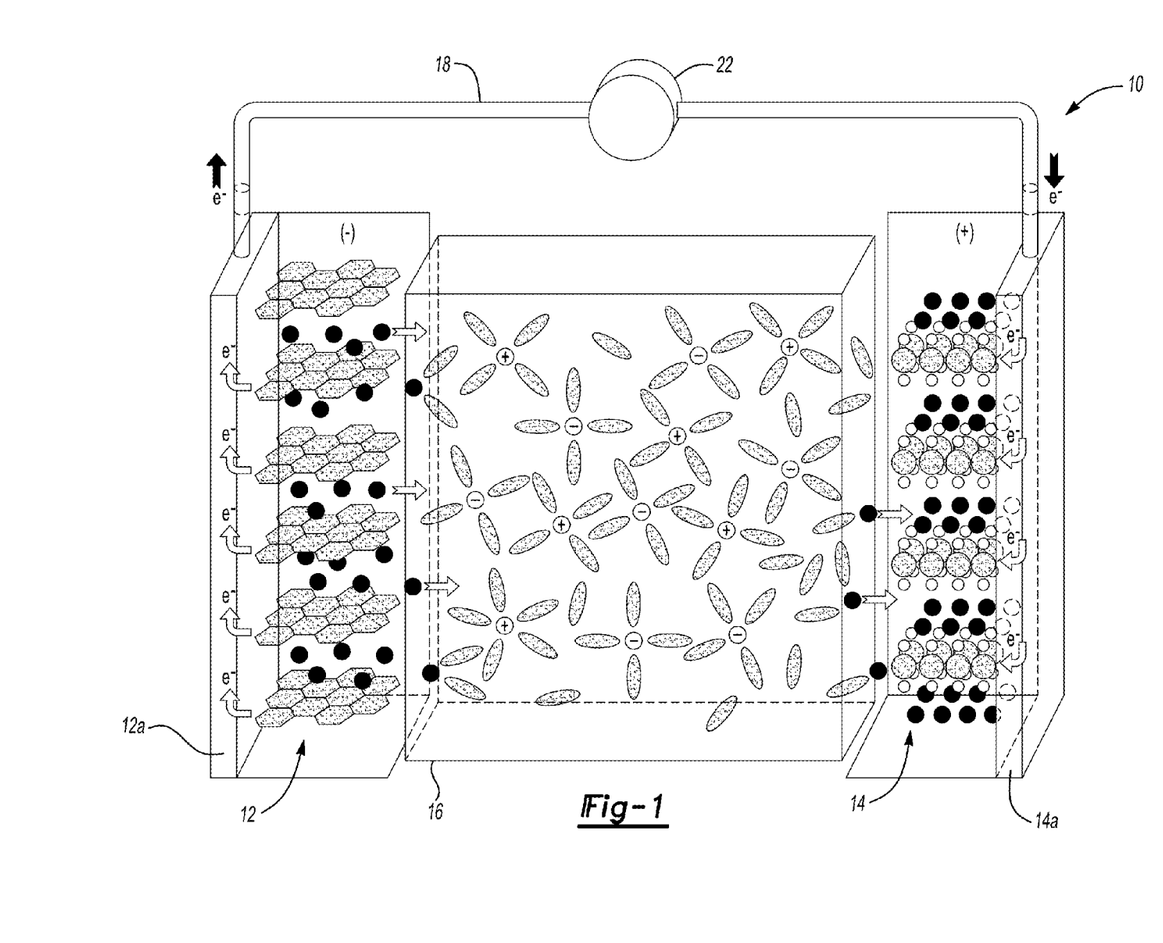
FIG. 1 schematically illustrates an example of a lithium ion battery during a discharging state.

An example of a secondary lithium ion battery 10 is schematically shown in FIG. 1. The battery 10 generally includes a negative electrode 12, a positive electrode 14, a microporous polymer separator 16 sandwiched between the two electrodes 12, 14, and an interruptible external circuit 18 that connects the negative electrode 12 and the positive electrode 14. Each of the negative electrode 12, the positive electrode 14, and the microporous polymer separator 16 may be soaked in an electrolyte solution capable of conducting lithium ions. The microporous polymer separator 16, which operates as both an electrical insulator and a mechanical support, is sandwiched between the negative electrode 12 and the positive electrode 14 to prevent physical contact between the two electrodes 12, 14 and the occurrence of a short circuit. The microporous polymer separator 16, in addition to providing a physical barrier between the two electrodes 12, 14, may also provide a minimal resistance to the internal passage of lithium ions (identified by the black dots and by the open circles having a (+) charge in FIG. 1), and related anions (identified by the open circles having a (−) charge in FIG. 1) through the electrolyte solution filling its pores, to help ensure the lithium ion battery 10 functions properly. A negative-side current collector 12a and a positive-side current collector 14a may be positioned in contact with the negative electrode 12 and the positive electrode 14, respectively, to collect and move free electrons to and from the external circuit 18.

The lithium ion battery 10 may support a load device 22 that can be operatively connected to the external circuit 18. The load device 22 may be powered fully or partially by the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool, to name but a few. The load device 22 may also, however, be a power-generating apparatus that charges the lithium ion battery 10 for purposes of storing energy. For instance, the tendency of windmills and solar panel displays to variably and/or intermittently generate electricity often results in a need to store surplus energy for later use.

The lithium ion battery 10 can include a wide range of other components that, while not depicted here, are nonetheless known to skilled artisans. For instance, the lithium ion battery 10 may include a casing, gaskets, terminal caps, and any other desirable components or materials that may be situated between or around the negative electrode 12, the positive electrode 14, and/or the microporous polymer separator 16 for performance-related or other practical purposes. Moreover, the size and shape of the lithium ion battery 10 may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10 may also be connected in series and/or in parallel with other similar lithium ion batteries to produce a greater voltage output and current (if arranged in parallel) or voltage (if arranged in series) if the load device 22 so requires.

The lithium ion battery 10 can generate a useful electric current during battery discharge by way of reversible electrochemical reactions that occur when the external circuit 18 is closed to connect the negative electrode 12 and the positive electrode 14 at a time when the negative electrode 12 contains a sufficiently higher relative quantity of intercalated lithium. The chemical potential difference between the positive electrode 14 and the negative electrode 12 (approximately 3.7 to 4.2 volts depending on the exact chemical make-up of the electrodes 12, 14) drives electrons produced by the oxidation of intercalated lithium at the negative electrode 12 through the external circuit 18 towards the positive electrode 14. Lithium ions, which are also produced at the negative electrode, are concurrently carried by the electrolyte solution through the microporous polymer separator 16 and towards the positive electrode 14. The electrons flowing through the external circuit 18 and the lithium ions migrating across the microporous polymer separator 16 in the electrolyte solution eventually reconcile and form intercalated lithium at the positive electrode 14. The electric current passing through the external circuit 18 can be harnessed and directed through the load device 22 until the intercalated lithium in the negative electrode 12 is depleted and the capacity of the lithium ion battery 10 is diminished.

The lithium ion battery 10 can be charged or re-powered at any time by applying an external power source to the lithium ion battery 10 to reverse the electrochemical reactions that occur during battery discharge. The connection of an external power source to the lithium ion battery 10 compels the otherwise non-spontaneous oxidation of intercalated lithium at the positive electrode 14 to produce electrons and lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle. The external power source that may be used to charge the lithium ion battery 10 may vary depending on the size, construction, and particular end-use of the lithium ion battery 10. Some suitable external power sources include an AC wall outlet and a motor vehicle alternator.

The negative electrode 12 may include any lithium host material that can sufficiently undergo lithium intercalation and deintercalation while functioning as the negative terminal of the lithium ion battery 10. The negative electrode 12 may also include a polymer binder material to structurally hold the lithium host material together. For example, in one example, the negative electrode 12 may be formed from graphite intermingled in at least one of polyvinylidene fluoride (PVdF), an ethylene propylene diene monomer (EPDM) rubber, or carboxymethyl cellulose (CMC). Graphite is widely utilized to form the negative electrode because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.,). Other materials can also be used to form the negative electrode including, for example, lithium titanate. The negative-side current collector 12a may be formed from copper or any other appropriate electrically conductive material known to skilled artisans.

The positive electrode 14 may be formed from any lithium-based active material that can sufficiently undergo lithium intercalation and deintercalation while functioning as the positive terminal of the lithium ion battery 10. The positive electrode 14 may also include a polymer binder material to structurally hold the lithium-based active material together. One common class of known materials that can be used to form the positive electrode 14 is layered lithium transitional metal oxides. For example, in various examples, the positive electrode 14 may comprise at least one of spinel lithium manganese oxide ($LiMn_2O_4$), lithium cobalt oxide ($LiCoO_2$), a nickel-manganese oxide [$Li(Ni_{0.5}Mn_{1.5})O_2$], a nickel-manganese-cobalt oxide [$Li(Ni_xMn_yCo_z)O_2$], or a lithium iron polyanion oxide such as lithium iron phosphate ($LiFePO_4$) or lithium iron fluorophosphate ($Li_2FePO_4F$) intermingled in at least one of polyvinylidene fluoride (PVdF), an ethylene propylene diene monomer (EPDM) rubber, or carboxymethyl cellulose (CMC). Other lithium-based active materials may also be utilized besides those just mentioned. Those alternative materials include lithium nickel oxide ($LiNiO_2$), lithium aluminum manganese oxide ($Li_xAl_yMn_{1-y}O_2$), and lithium vanadium oxide ($LiV_2O_5$), to name but a few. The positive-side current collector 14a may be formed from aluminum or any other appropriate electrically conductive material known to skilled artisans.

Any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$ $LiAsF_6$, $LiCF_3SO_3$, $LiN(CF_3SO_2)_2$, $LiPF_6$, and mixtures thereof. These and other similar lithium salts may be dissolved in a variety of organic solvents such as cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 16 includes, or in some examples, is a membrane, and this membrane may be formed, e.g., from a polyolefin. The polyolefin may be a homopolymer (derived from a single monomer constituent) or a heteropolymer (derived from more than one monomer constituent), either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. In one example, the polyolefin may be polyethylene (PE), polypropylene (PP), or a blend of PE and PP.

In another example, the membrane of the microporous polymer separator 16 (which may also be referred to herein as simply the microporous polymer separator 16) may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 16 is poly(p-hydroxybenzoic acid).

In yet another example, the membrane of the microporous separator 16 may be chosen from a combination of the polyolefin (such as PE and/or PP) and one or more of the polymers for the separator 16 listed above.

The microporous polymer separator 16 may contain a single layer or a multi-layer laminate fabricated from either a dry or wet process. For example, in one example, a single layer of the polyolefin may constitute the entirety of the microporous polymer separator 16 membrane. In another example, a single layer of one or a combination of any of the polymers from which the microporous polymer separator 16 may be formed (e.g, the polyolefin and/or one or more of the other polymers listed above for the separator 16) may constitute the entirety of the separator 16. As another example, however, multiple discrete layers of similar or dissimilar polyolefins and/or polymers for the separator 16 may be assembled into the microporous polymer separator 16. In one example, a discrete layer of one or more of the polymers may be coated on a discrete layer of the polyolefin for the separator 16. Further, the polyolefin (and/or other polymer) layer, and any other optional polymer layers, may further be included in the microporous polymer separator 16 as a fibrous layer to help provide the microporous polymer separator 16 with appropriate structural and porosity characteristics. Skilled artisans will undoubtedly know and understand the many available polymers and commercial products from which the microporous polymer separator 16 may be fabricated, as well as the many manufacturing methods that may be employed to produce the microporous polymer separator 16. A more complete discussion of single and multi-layer lithium ion battery separators, and the dry and wet processes that may be used to make them, can be found in P. Arora and Z. Zhang, "Battery Separators," *Chem. Rev.,* 104, 4424-4427 (2004).

In an example, the chelating agent(s) is/are attached to a polymer, and the polymer (having the chelating agent(s) attached thereto) is incorporated into or applied onto a surface of the microporous polymer separator 16 or the positive electrode 14. In an example, the polymer is incorporated into or applied onto a surface of the positive electrode 14 and the negative electrode 12. Thus, the chelating agent is not present in the lithium ion battery as free molecules. Furthermore, the polymer to which the chelating(s) is/are attached may be chosen from any one, or a mixture of any of the materials of the membrane of the microporous polymer separator 16 identified above.

In another example, the chelating agent(s) is/are attached to the polymer that makes up the membrane of the separator 16. In this example, the chelating agent(s) is/are incorporated into the membrane during fabrication of the separator 16.

The chelating agent(s) may be any of a variety of molecules that can complex with unwanted metal cations to form stable and neutral compounds while, at the same time, not adversely affecting the flow of lithium ions between the negative and positive electrodes 12, 14. The particular chelating agent or agents may, in some instances, be chosen to selectively complex with certain metal cations that are known or expected to be present in the electrolyte solution at some point during operational lifetime of the lithium ion battery 10. For example, spinel lithium manganese oxide ($LiMn_2O_4$) that may be present in the positive electrode 14 may leach $Mn^{2+}$ cations into the electrolyte solution during normal operation of the lithium ion battery 10. These mobile $Mn^{2+}$ cations, in turn, can migrate through the electrolyte solution and across the microporous polymer separator 16 until they eventually reach the negative electrode 12. Moreover, if the negative electrode 12 is formed from graphite, the $Mn^{2+}$ cations that reach the negative electrode 12 tend to undergo a reduction reaction and deposit on the graphite surface or within the surface films covering the graphite electrode since the standard redox potential of Mn/Mn(II) is much higher than the potential at which lithium intercalation into graphite occurs. The deposition of manganese onto graphite in the negative electrode 12 catalyzes the reduction of solvent molecules at the contaminated interface of the negative electrode 12 and the electrolyte solution causing the evolution of gases. The poisoned portion of the negative electrode 12 is essentially deactivated and no longer able to facilitate the reversible gain and loss of intercalated lithium. Similarly, the dissolution of cobalt cations ($Co^{2+}$) and iron cations ($Fe^{2+}$) from lithium cobalt oxide ($LiCoO_2$) and lithium iron phosphate ($LiFePO_4$), respectively, that may be present in the positive electrode 14 can also cause capacity losses in the lithium ion battery 10 by the same or related mechanism. The leaching of $Co^{2+}$ cations may occur, in one instance, because of an ancillary chemical reaction with various adhesives normally used in the packaging of the lithium ion battery 10. The leaching of $Fe^{2+}$ cations may occur, in one instance, because of the presence of hydrofluoric acid that may be produced through the ingress and egress of water into the electrolyte solution. $Ni^{+2}$ cations may come from the mixed transition metal oxide of the positive electrode 14.

Regardless of the lithium-based active material(s) used in the positive electrode 14, the leaching rate of metal cations into the electrolyte solution may vary. The leaching rate of metal cations from positive electrode 14 may be relatively slow and require several years for the electrolyte solution to accumulate a concentration of associated metal cations measurable in parts per million (ppm). The leaching rate of metal cations from the positive electrode 14 may also, on the other hand, be relatively fast in that the concentration of associated metal cations in the electrolyte solution increases by about 0.1 weight percent per battery power cycle. The leaching of any amount of metal cations from the positive electrode 14, whether slow or fast, can nevertheless poison large areas of the graphite in the negative electrode 12 and ultimately cause a noticeable and performance-affecting reduction in capacity of the lithium ion battery 10. An amount of chelating agents effective to sequester the cumulative dissolution of metal cations into the electrolyte solution during the operational lifetime of the lithium ion battery 10 may therefore be attached to a polymer which is incorporated into, or applied to a surface of the microporous polymer separator 16 and/or the negative or positive electrodes 12, 14. The exact amount of chelating agents employed, which may vary considerably, is generally predicated on the chemistry of the lithium ion battery 10, the, compositional make-up of the negative and positive electrodes 12, 14, and the expected or observed rate at which unwanted metal cations are introduced into the electrolyte solution during operation of the lithium ion battery.

The chelating agents may include, for example, a crown ether, a podand, a lariat ether, a calixarene, a calixcrown, or mixtures thereof. These chelating agents are useful because they will not strongly complex with the relatively small lithium ions moving between the negative and positive electrodes 12, 14 because of their size and spatial constructions. Skilled artisans will generally know and understand, or be able identify the many molecular compounds that may constitute these classes of chelating agents. A generalized description of these chelating agents is nonetheless provided here for convenience.

A crown ether is a macrocyclic polyether in which the polyether ring includes oxygen donor atoms that can complex with a metal cation. Some or all of the oxygen donor atoms in the polyether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a metal cation, or polycyclic, in which the crown ether forms a more three-dimensional cage for complexing with a metal cation. One example of a polycyclic crown ether is a cryptand (such as, e.g., cryptand [2.2.2], cryptand [2.2.1], and cryptand [2.1.1]). One or more oxygen atoms in the cryptand or other crown ether may also be substituted at any location along its polyether ring by any of a variety of atoms or functional groups known to those skilled in the art. For example, the crown ether may include sulfur substituted at one or more oxygen sites, or may include nitrogen substituted at one or more oxygen sites. It is believed that crown ethers having structures where i) the size of the cavity defined by the crown structure has a diameter that is close to the size of the ion (e.g., the transition metal cation) to be trapped, and ii) a permanent dipole moment possesses a maximum charge for any given separation between positive and negative charges of the structure are most desirable for use in the examples of the lithium battery disclosed herein. For instance, a chelating agent possessing a permanent dipole moment (such as crown ethers having an odd number of oxygen atoms in its polyether ring (e.g., 15-crown-5 or 21-crown-7), and further have thia- (i.e., sulfur) or aza- (i.e., nitrogen) substitutions that tend to break the symmetry of the charge distribution of a symmetric crown ether or an increase in the charge separation on an asymmetric chelating agent) will align counter-parallel to an externally applied electric field to minimize its external potential energy. This will, in effect, maximize the ion trapping ability of the crown ether.

Further, a podand is an acyclic polyether ligand that includes donor-group-bearing arms that can complex with a metal cation. A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calix-crown is a calixarene that includes a polyether ring that links two phenolic oxygens of the calixarene framework. The indifference these chelating agents show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the chelating agents just mentioned may also be employed.

A list of crown ethers that can complex with metal cations which may, for example, leach into the electrolyte solution from the positive electrode 14 (such as cations of manganese, cobalt, and iron) includes: 15-crown-5 (1); dibenzo-15-crown-5 (2); 18-crown-6 (3); benzo-18-crown-6 (4); dibenzo-18-crown-6 (5); 21-crown-7 (not shown); dibenzo-21-crown-7 (6); dicyclohexano-18-crown-6 (7); dicyclohexano-24-crown-8 (8); poly(dibenzo-18-crown-6)(9); 1,4,7,10, 13,16-hexathia-18-crown-6 (10); 1,4,7,10,13,16-hexaaza-18-crown-6 (11); 1-aza-18-crown-6 (12); 1,10-diaza-18-crown-6 (13); N,N'-dibenzyl-4,13-diaza-18-crown-6 (14); and 4,7,13,16,21,24-hexaoxa-1,10-diazabicyclo[9.8.8]hexacosane (15), some of the structures of which are shown below. The hydrogen atoms in the 1,4,7,10,13,16-hexaaza-18-crown-6 structure, the 1-aza-18-crown-6 structure, and the 1,10-diaza-18-crown-6 structure are assumed.

-continued (8)

(9)

(10)

(11)

(12)

(13)

(14)

(15)

Some more examples of crown ethers, including thiacrowns and azacrowns, that may be attached to the microporous polymer separator 16 can be found in W. Walkowiak and C. A. Kozlowski, "Macrocycle Carriers for Separation of Metal Ions in Liquid Membrane Processes—A Review," *Desalination* 240, Table 1 on pg. 189 (compounds 1-15 that are not already mentioned above) (2009); R. L. Bruening, R. M. Izatt, and J. S. Bradshaw, "Understanding Cation-Macrocycle Binding Selectivity in Single-Solvent Extractions, and Liquid Membrane Systems by Quantifying Thermodynamic Interactions, FIG. 1 on pg. 112 in "Cation Binding by Macrocycles,"Y. Inoue and G. W. Gokel (editors), Chapter 2, 1990, Marcel Dekker Inc., New York and Basel; J. L. Tonor, "Modern Aspects of Host-Guest Chemistry: Molecular Modeling and Conformationally Restricted Hosts," FIG. 2 on pg. 82 in "Crown Ethers and Analogs," S. Patai and Z. Rappaport (editors), Chapter 3, 1989, John Wiley and Sons, New York; F. Vogtle and E. Weber, "Crown-ether-complexes and Selectivity," FIGS. 1, 2, and 3 on pg. 209, 210, and 211, respectively, in "Crown Ethers and Analogs," S. Patai and Z. Rappaport (editors), Chapter 4, 1989, John Wiley and Sons, New York, the above-identifed portions of each reference being hereby incorporated by reference.

A list of podands that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 32a and 32b) (2009); A. Shahrisa and A. Banaei, "Chemistry of Pyrones, Part 3: New Podands of 4H-Pyran-4-ones, 5 *Molecules*," FIGS. 1 and 3 on pg. 201 (2000); and F. Vogtle and E. Weber, "Crown-ether-complexes and Selectivity," FIGS. 4, 5, 6, and 7 on pg. 212, 213, 214, and 215, respectively, in "*Crown Ethers and Analogs*," S. Patai and Z. Rappaport (editors), Chapter 4, 1989, John Wiley and Sons, New York; and Crown Ethers and Analogs, edited by Patai and Rappoport, (1989), the above-identified portions of each reference being hereby incorporated by reference.

A list of lariat ethers that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 1 on pg. 189 (compounds 16-18)

(2009); and E. Weber, "New Developments in Crown Ether Chemistry: Lariats, Spherands, and Second-Sphere Complexes," FIGS. 2, 4, and 6 on pg. 307, 309, and 315, respectively, in "Crown Ethers and Analogs," S. Patai and Z. Rappaport (editors), Chapter 5, 1989, John Wiley and Sons, New York, the above-identified portions of each reference being hereby incorporated by reference.

A list of calixarenes that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 22-23) (2009); and J. L. Atwood, "Cation Complexation by Calixarenes," FIGS. 6 and 7 on pg. 587 (the ester functionalized calixarenes) in "Cation Binding by Macrocycles," Y. Inoue and G. W. Gokel (editors), Chapter 15, 1990, Marcel Dekker Inc., New York and Basel, the above-identified portions of each reference being hereby incorporated by reference.

A list of calixcrowns that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 24-27, compound 28 with ester functionality, and compounds 30-31) (2009), the above-identified portions of each reference being hereby incorporated by reference.

There are, of course, many other crown ethers, podands, lariat ethers, calixarenes, calixcrowns, and related chelating agents that are known to skilled artisans, but are not specifically mentioned here, that can be attached to, coated onto, incorporated/embedded into, or included in the electrolyte of the microporous polymer separator 16 to sequester and immobilize unwanted metal cations that may be introduced into the electrolyte solution of the lithium ion battery 10.

Figure 2A:
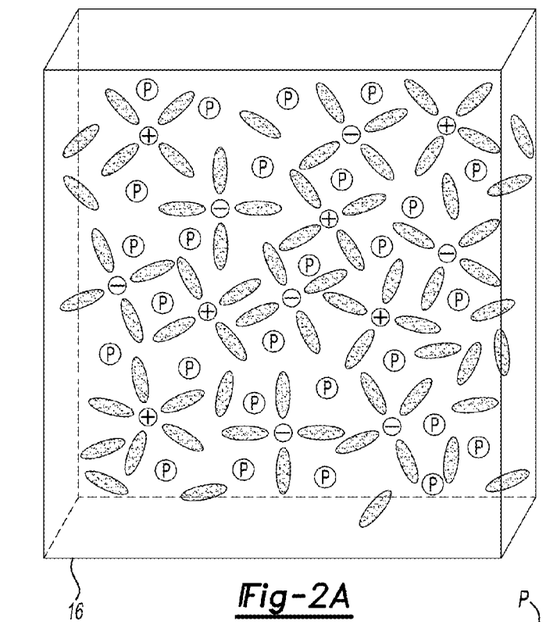
FIG. 2A schematically illustrates an example of a microporous polymer separator of a lithium ion battery including polymer particles incorporated therein.

Various examples of how the polymer including the chelating agent(s) attached thereto is incorporated into the lithium ion battery 10 are shown in FIGS. 2A, 2B, 3A, and 3B. In one example, the polymer having the chelating agent(s) tethered thereto is incorporated into the microporous polymer separator 16, as shown in FIG. 2A. For instance, the polymer (identified by the letter P in the figures), which may be present in granular or particle form having an effective diameter, e.g., of about 100 nanometers, is dispersed throughout the membrane of the separator 16. In another example, the polymer P (i.e., the polymer functionalized with the chelating agent) in granular form may be floating within the electrolyte inside the separator 16. The polymer P may, for instance, be incorporated into the separator 16 during fabrication of the separator 16, such as, e.g., by extrusion or solvent casting. In another example, the polymer P may be incorporated into the separator 16 by mixing the polymer P with the main polymer in the separator 16 formulation.

Figure 2B:
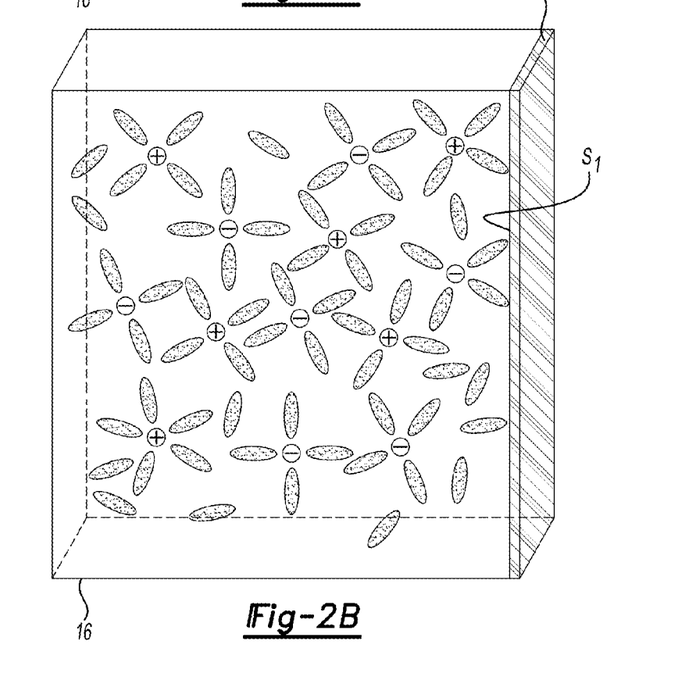
FIG. 2B schematically illustrates another example of the microporous polymer separator including a polymer layer applied to a surface of the separator.

Another example is shown in FIG. 2B, and this example includes applying the polymer P (which is a polymer having the chelating agent(s) tethered thereto) to a surface (e.g., surface $S_1$ as shown in FIG. 2B) of the separator 16. It is to be understood that the polymer may be applied to a single surface (e.g., $S_1$ as shown in FIG. 2B), or may be applied to two or more surfaces of the separator 16 (such as the opposing surface to $S_1$). In this example, the polymer, which may originally be provided in granular form, may be coated (as a thin layer) on the surface $S_1$ of the separator 16, e.g., by dissolving the polymer in an appropriate solvent, and then applying the solution to the surface $S_1$. The solvent is used to induce the formation of pores in the thin polymer layer.

Another way to form the thin layer of the polymer includes providing a slurry of the polymer P in the form of insoluble, sub-micron-sized spheres (or other geometric configuration) in a solvent and binder solution (e.g., PVdF binder in an N-methyl-2-pyrrolidone solvent). The slurry may then be deposited onto a pre-existing separator 16 membrane. When the slurry is applied to (or deposited on) the surface $S_1$ of the separator 16, and upon evaporation of the solvent, the binder holds the polymer spheres together and provides adhesion onto the surface $S_1$ as a layer.

Yet other methods of incorporating the polymer P into the separator 16 (either by incorporating the polymer P into the membrane or by applying the polymer P, as a layer, onto the membrane) includes solvent spraying, painting, dip coating, electrophoretic coating, pressure filtration, electrospinning, compression molding, or combinations thereof. In some cases, plasmas, ion etching and chemical etching with free radicals may also be used to graft the polymer P to the membrane.

Figure 3A:
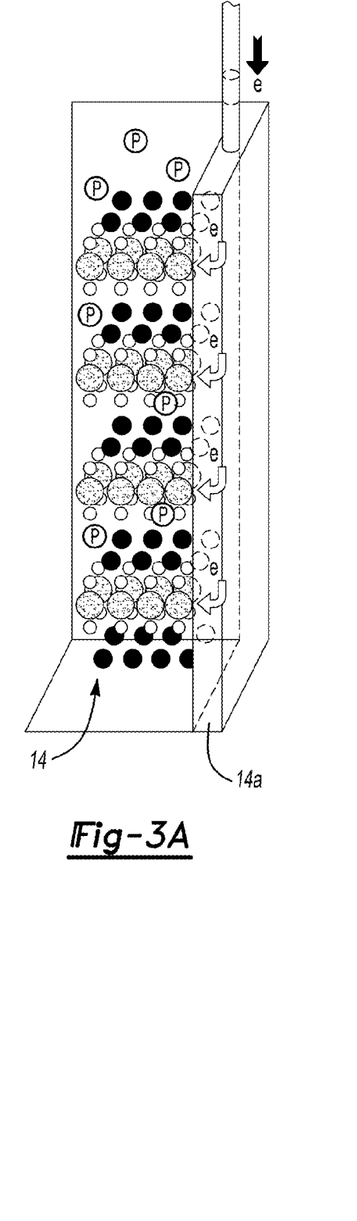
FIG. 3A schematically illustrates an example of a positive electrode for a lithium ion battery including polymer particles incorporated therein.
Figure 3B:
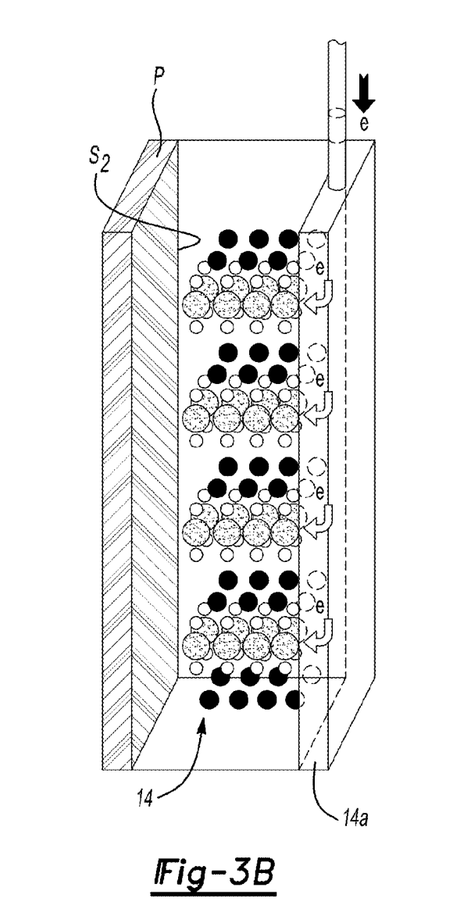
FIG. 3B schematically illustrates another example of the positive electrode including a polymer layer applied to a surface of the electrode.

As shown in FIGS. 3A and 3B, the polymer is incorporated into (FIG. 3A), or applied to a surface of (FIG. 3B) the positive electrode 14. As briefly mentioned above, the polymer may otherwise be incorporated into, or applied to a surface of the negative electrode or both of the negative and positive electrodes. These examples, however, are not shown in the figures.

Referring now to FIG. 3A, the polymer (having the chelating agent(s) tethered thereto) is incorporated into the positive electrode 14. In this example, the polymer, again which may be present in granular form, is dispersed throughout the bulk of the positive electrode 14 material. The process(es) used to incorporate the polymer P into the separator 16 may also be used to incorporate the polymer P into the positive electrode 14.

As shown in FIG. 3B, the polymer (having the chelating agent(s) tethered thereto) is applied to a surface (e.g., surface $S_2$ as shown in FIG. 3B) of the positive electrode 14. The process(es) used to apply the polymer P onto a surface of the separator 16 may also be used to apply the polymer P onto a surface of the positive electrode 14.

Also disclosed herein are examples of a method of making a lithium ion battery 10. For all of the example methods disclosed herein, the method includes forming the polymer P by tethering a chelating agent to a polymer. Tethering of the chelating agent to the polymer may be accomplished using any known method, one example of which includes grafting and/or chemically bonding the chelating agent onto particles of the polymer material.

Once the polymer P has been formed, the polymer P may, in one example method, be applied to a surface of the membrane of the separator 16, to a surface of the negative electrode 12, and/or to a surface of the positive electrode 14, as described above. In this example, a greater concentration of the polymer P is present on the side of the separator 16 that is coated (e.g., the side adjacent to the positive electrode 14). Such a build-up of the chelating agent(s) on the positive-electrode-side of the separator 16 can help facilitate the earliest possible sequestering of any destructive metal cations that leach into the electrolyte solution from the positive electrode 14.

Thereafter, the separator 16 is arranged between the negative 12 and the positive 14 electrodes to complete the battery 10.

In another example method, once the polymer P has been formed, the polymer P may be incorporated into the membrane of the separator 16, into the negative electrode 12 and/or into the positive electrode 16. Thereafter, the separator 16 is arranged between the negative 12 and the positive 14 electrodes to complete the battery 10.

To further illustrate the present disclosure, examples are given herein. It is to be understood that these examples are provided for illustrative purposes and are not to be construed as limiting the scope of the disclosure.

EXAMPLES

Example 1

A polymer separator is formed via emulsion polymerization of 4-vinylbenzo-18-crown-6 using divinylbenzene as a cross-linker. The reaction scheme for this example is as follows:

(polyvinylbenzo-18-crown-6)
(Polymer 1)

In this example, about 10 g of de-ionized water, about 0.0005 g of ammonium persulfate, about 0.0005 g of sodium hydrogen phosphate, about 0.01 g of sodium lauryl sulfate, about 0.5 g of 4-vinyl-benzo-18-crown-6, and about 0.01 g of divinylbenzene were added to a 250 mL, 3-neck flask equipped with a stir bar, reflux condenser, and argon inlet. The flask was situated in an oil bath. The mixture was stirred, and then purged for about 15 minutes with argon. The purged mixture was heated at about 70° C. for about 2 hours under the argon with magnetic stirring. The reaction temperature was increased to about 95° C., and was then maintained at that temperature for about 16 hours with magnetic stirring. The reaction mixture was transferred to a dialysis tube (SPECTROPORE™), and was dialyzed against about 4 liters of water with two de-ionized water changes per day for 7 days. The milky dispersion was concentrated using a rotary evaporator. Further, dry particles of the polymer were obtained by freeze-drying the dispersion.

The resultant dispersion from the foregoing synthesis consisted of 140 nm particles having an approximately monomodal size distribution. This dispersion in isopropanol was pressure-filtered onto a polyethylene separator. The percent increase in mass of the different separators coated with a thin porous layer of cross-linked poly(vinylbenzo-18-crown-6) ranges from about 250 to about 450. Alternatively, a portion of the milky aqueous dispersion was freeze-dried to yield about 0.05 g of emulsion particles, which were then added to the propylene carbonate electrolyte solution of the battery.

Figure 4:
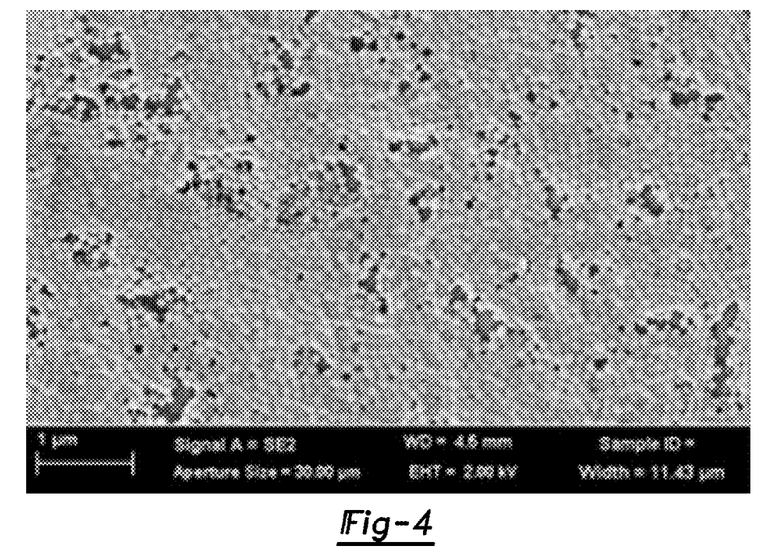
FIG. 4 is a scanning electron micrograph (SEM) image of a battery separator coated with a poly(vinylbenzo-18-crown-6) chelating agent.

Tests were performed to determine the discharge capacity (%) of the lithium ion battery including a battery separator having the poly(vinylbenzo-18-crown-16) chelating agent coated thereon. A scanning electron micrograph (SEM) image of the battery separator having the poly(4-vinylbenzo-18-crown-6) chelating agent coated thereon is shown in FIG. 4. The tests were performed utilizing lithium-manganese dioxide spinel coin cells having the 2032 format (i.e., a coin cell having a 20 mm diameter and a 3 mm thickness) using a MACCOR™ cycler (available from Maccor, Inc.) inside a constant temperature chamber. The cells were exposed to constant current conditions that correspond to a five hour charge and discharge rate. The MACCOR™ cycler automatically returned a voltage value as a function of time, as well as the charge passed through the cells through each charge/discharge cycle.

Figure 5:
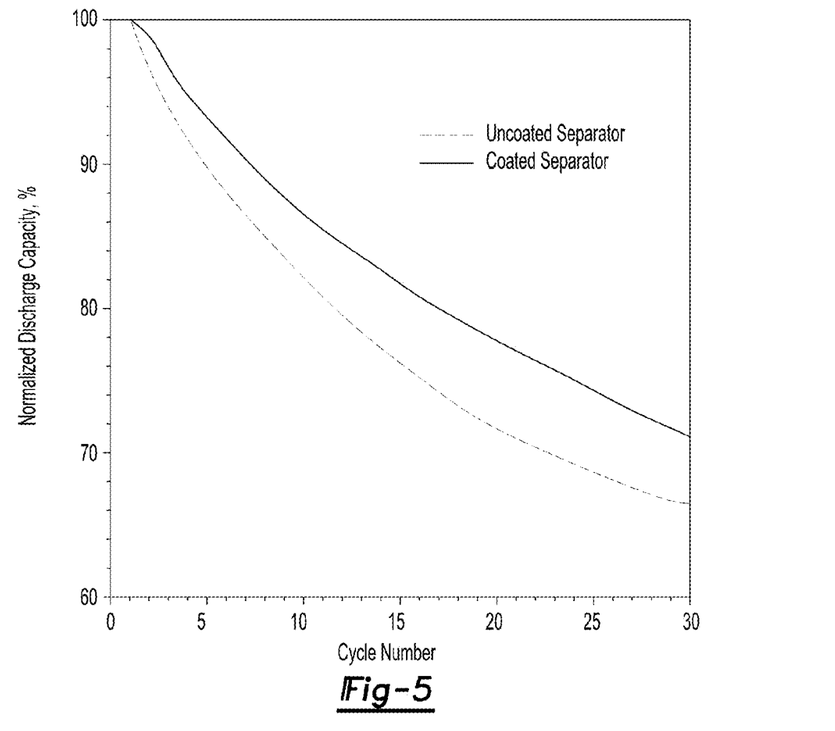
FIG. 5 is a graph showing a comparison between the discharge capacity of a lithium ion battery utilizing a separator coated with the poly(vinylbenzo-18-crown-6) chelating agent and another lithium ion battery having an uncoated separator.

The performance of this lithium ion battery (in terms of its discharge capacity) was compared to another lithium ion battery having an uncoated battery separator (i.e., one that did not utilize a chelating agent). Each of the lithium ion batteries included a positive electrode formed from $LiMn_2O_4$ and a negative electrode formed from graphite. Further, the batteries utilized a 1M $LiPF_6$ salt solution in an ethylene carbonate (EC) to ethylmethyl carbonate (EMC) (i.e., EC:EMC) solvent mixture. In this example, the EC:EMC mixture was 1:2. The batteries were also operated at a temperature of about 60° C., a current density of 0.36 mA/cm², and a voltage ranging from 2.5 V to 4.2 V.

FIG. 5 is a graph showing the comparison of the normalized discharge capacity (%) over the cycle life (i.e., where one cycle number is equal to 5 hours of charging and 5 hours of discharging) of each of these batteries (30 cycles shown in FIG. 5). The discharge capacity over time (in terms of cycle life) of the battery including the separator coated with the poly(vinylbenzo-18-crown-16) chelating agent is represented by a solid line in the graph, and the discharge capacity over time of a battery not including the uncoated separator is represented by a dotted line in the graph. The results show that the battery including the coated separator (i.e. the separator coated with the poly(vinylbenzo-18-crown-16) chelating agent) performed better than the battery having the uncoated separator. As shown in FIG. 5, over time, the operable life of the battery having the uncoated separator diminished more quickly than the battery including the separator coated with the poly(vinylbenzo-18-crown-16) (i.e., PVB-18C6) chelating agent. For instance, at 5 cycles, the battery including the separator coated with the poly(vinylbenzo-18-crown-16) chelating agent had a normalized discharge capacity of about 87%, whereas the battery with the uncoated separator had a discharge capacity of about 84%. At 10 cycles, the battery including the poly(vinylbenzo-18-crown-16) chelating agent had a normalized discharge capacity of about 83%%, whereas the battery with the uncoated separator had a discharge capacity of about 76%.

Example 2

In another example, the polymer P is formed via polymerization of dibenzo-18-crown-6-co-formaldehyde, which was purchased from Sigma-Aldrich (St. Louis, Mo.). The dibenzo-18-crown-6-co-formaldehyde polymer is shown below:

(Polymer 2)

In this example, about 0.1 g of poly((dibenzo-18-crown-6)-co-formaldehyde) is roll-milled for about 2 weeks with about 24 g of isopropanol and about 50 g of glass beads. The mixture is filtered through an 84-micrometer polypropylene filter (PROPYLTEX™, Sefar-America, Inc. (Kansas City, Mo.)), and the filtrate is pressure-filtered onto a polyethylene separator. The percent increase in mass of the different separators coated with a thin porous layer of the poly((dibenzo-18-crown-6)-co-formaldehyde) ranged from about 250 to about 450.

Example 3

In yet another example, a polymer separator was formed from poly(undecylenyl-oxymethyl-18-crown-6). The polymers formed in this example are shown below:

(Polymer 3)

-continued (Polymer 4)

(Polymer 5)

This example includes preparing poly(undecylenyl iodide) and poly(undecylenyloxymethyl-18-crown-6), and then using the poly(undecylenyloxymethyl-18-crown-6) to ultimately form the separator. Poly(undecylenyl iodide) and poly(undecylenyloxymethyl-18-crown-6) were prepared as follows. A monomer solution was formed by adding about 6.2 g of undecylenyl iodide and about 30 mL of toluene to a 125-mL screw-cap jar. Nitrogen, in a glove bag, was added to the monomer solution, as well as about 25 wt % diethylaluminum chloride in toluene (about 6 mL), about 0.75 teaspoon of titanium (III) chloride-aluminum chloride reduced, and the mixture was stirred with a magnetic stir bar. The lid of the jar was secured, and the reaction mixture (which had a purple color) was magnetically stirred for about 16 hours. Methanol was cautiously added drop-wise to the purple mixture, and the resultant mixture (now a yellow color) was added to about 300 mL of methanol in a Waring blender using a stirring speed controlled using a Variac. The resultant polymer was collected, washed with about 200 mL of water, and then washed with about 200 mL of methanol. After air drying, a poly (undecylenyl iodide) was obtained, which was clear and sticky. The polymer was also soluble in tetrahydrofuran, methylene chloride, and toluene, but insoluble in water and methanol.

Then, about 150 mL of freshly distilled tetrahydrofuran and about 60 wt % of sodium hydride in mineral oil (about 6 g) was added to about 3 g of the poly(undecylenyl iodide). While stirring with a magnetic stirring under argon, about 4 g of 2-hydroxymethyl-18-crown-6 was added. Thereafter, the polymer precipitates. After stirring for about 3 days at about 23° C., the reaction mixture was homogenized using an IKA® Homogenizer to break-up the solid brown mass. After continued stirring for about 11 more days, the reaction mixture was heated for about 8 hours at 50° C., followed by stirring for about 16 hours at 23° C. Isopropanol was cautiously added drop-wise to quench the remaining sodium hydride. The reaction mixture was concentrated using a rotary evaporator and added to about 300 mL of water. After centrifugation, the top-surface brown polymeric layer was washed extensively with water than then dispersed in isopropanol. The polymer was pressure-filtered onto a polyethylene separator for the lithium ion battery. The percent increase in mass of the separator coated with the thin porous layer of poly(undecylenyl-oxymethyl-18-crown-6) was about 250. Loadings of polymers with 18-crown-6 onto the battery separator ranged from about 30 to about 500 wt % as determined by the following equation:

$$\frac{[(mass_{crown-ether}) + (mass_{separator})] - mass_{separator}}{mass_{separator}} \times 100\%$$

Example 4

A battery separator was made by micronization of poly (undecylenyl-oxymethyl-18-crown-6) via melt extrusion. In this example, about 2 g of poly(undecylenyl-oxymethyl-18-crown-6) (which was prepared according to the method described in Example 3 above) was mixed with about 20 g of 50,000 molecular weight poly(2-ethyl-2-oxazoline). The mixture was extruded at 130° C. The extrudate was added to water to dissolve the water-soluble poly(2-ethyl-2-oxazoline), and the water-insoluble poly(undecylenyl-oxymethyl-18-crown-6) was collected, dried, and then dispersed in isopropanol. The polymer was pressure filtered onto a polyethyelene separator. The percent increase in mass of the separator coated with the thin layer of poly(undecylenyl-oxymethyl-18-crown-6) was about 250.

Example 5

A polymer separator was made using poly((dibenzo-18-crown-6)-co-formaldehyde) and poly(undecylenyl-oxymethyl-18-crown-6). In this example, a mixture was formed from about 0.05 g of poly((dibenzo-18-crown-6)-co-formaldehyde) and about 0.05 g of poly(undecylenyl-oxymethyl-18-crown-6), and the mixture was dispersed in about 24 g of isopropanol. The dispersion was pressure-filtered onto a polyethylene separator. The percent increase in the mass of the different separators coated with the thin porous layer of the two crown ether polymers ranged from about 250 to about 450.

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from 2.5 V to 4.2 V should be interpreted to include not only the explicitly recited limits of 2.5 V to 4.2 V, but also to include individual values, such as 3 V, 3.2 V, 4 V, etc., and sub-ranges, such as from about 3.0 V to about 3.9 V, etc. Furthermore, when "about" is utilized to describe a value, this is meant to encompass minor variations (up to +1-10%) from the stated value.

While several examples have been described in detail, it will be apparent to those skilled in the art that the disclosed examples may be modified. Therefore, the foregoing description is to be considered non-limiting.

The invention claimed is:

1. A lithium ion battery, comprising:
a positive electrode;
a negative electrode;

a microporous polymer separator disposed between the negative electrode and the positive electrode; and a polymer having a chelating agent chemically bonded thereto, the polymer having the chelating agent chemically bonded thereto being incorporated into the lithium ion battery i) as particles dispersed throughout a main polymer of the microporous polymer separator or ii) as a separate layer on a surface of the microporous polymer separator;

wherein:

the polymer having the chelating agent chemically bonded thereto is selected from the group consisting of polyethylene terephthalates, polyvinylidene fluorides, polyamides, polyurethanes, polycarbonates, polyesters, polyetheretherketones, polyethersulfones, polyimides, polyamide-imides, polyethers, polyoxymethylenes, polybutylene terephthalates, polyethylenenaphthenates, polybutenes, polyolefins, polyolefin copolymers, acrylonitrile-butadiene styrene copolymers, polystyrene copolymers, polymethylmethacrylates, polyvinyl chlorides, polysiloxane polymers, polybenzimidazoles, polybenzoxazoles, polyphenylenes, polyarylene ether ketones, polyperfluorocyclobutanes, polytetrafluoroethylenes, polyvinylidene fluoride copolymers, polyvinylidene fluoride terpolymers, polyvinylidene chlorides, polyvinylfluorides, liquid crystalline polymers, polyaramides, polyphenylene oxides, and combinations thereof;

the chelating agent is selected from the group consisting of a crown ether, a podand, a lariat ether, a calixarene, a calixcrown, and combinations thereof; and the chelating agent complexes with metal cations of at least one of Mn, Co, Ni, or Fe in a manner sufficient to not affect movement of lithium ions across the microporous polymer separator during operation of the lithium ion battery.

2. The lithium ion battery as defined in claim 1 wherein the microporous polymer separator includes:

the main polymer; and the polymer with the chelating agent chemically bonded thereto as the particles dispersed throughout the main polymer;

the particles having an effective diameter of about 100 nm.

3. The lithium ion battery as defined in claim 1 wherein the microporous polymer separator comprises a membrane and wherein the polymer with the chelating agent chemically bonded thereto is applied as the layer, to one surface of the membrane or more than one surface of the membrane.

4. The lithium ion battery as defined in claim 1 wherein the crown ether is a cryptand.

5. The lithium ion battery as defined in claim 1 wherein the chelating agent is a crown ether chosen from any of a 15-crown-5, an 18-crown-6, or a 21-crown-7.

6. The lithium ion battery as defined in claim 1 wherein the chelating agent is a cryptand chosen from cryptand [2.2.2], cryptand [2.2.1], and cryptand [2.1.1].

7. The lithium ion battery as defined in claim 1 wherein the crown ether is substituted with one of sulfur or nitrogen at one or more oxygen sites of the crown ether.

8. The lithium ion battery as defined in claim 1 wherein the chelating agent is not present in the lithium ion battery as free molecules.

9. A method of making a lithium ion battery, comprising:

chemically bonding a chelating agent to a polymer, wherein the polymer is selected from the group consisting of polyethylene terephthalates, polyvinylidene fluorides, polyamides, polyurethanes, polycarbonates, polyesters, polyetheretherketones, polyethersulfones, polyimides, polyamide-imides, polyethers, polyoxymethylenes, polybutylene terephthalates, polyethylenenaphthenates, polybutenes, polyolefins, polyolefin copolymers, acrylonitrile-butadiene styrene copolymers, polystyrene copolymers, polymethylmethacrylates, polyvinyl chlorides, polysiloxane polymers, polybenzimidazoles, polybenzoxazoles, polyphenylenes, polyarylene ether ketones, polyperfluorocyclobutanes, polytetrafluoroethylenes, polyvinylidene fluoride copolymers, polyvinylidene fluoride terpolymers, polyvinylidene chlorides, polyvinylfluorides, liquid crystalline polymers, polyaramides, polyphenylene oxides, and combinations thereof, and the chelating agent is selected from the group consisting of a crown ether, a podand, a lariat ether, a calixarene, a calixcrown, and combinations thereof;

applying the polymer having the chelating agent chemically bonded thereto to a surface of a membrane of a microporous polymer separator; and arranging the microporous polymer separator between the negative electrode and the positive electrode;

wherein the chelating agent complexes with metal cations of at least one of Mn, Co, Ni, or Fe in a manner sufficient to not affect movement of lithium ions across the microporous polymer separator during operation of the lithium ion battery.

10. The method as defined in claim 9 wherein the chelating agent is chosen from 18-crown-6, 15-crown-5, cryptand [2.2.2], cryptand [2.2.1], or cryptand [2.1.1].

11. The method as defined in claim 9 wherein the crown ether is substituted with one of sulfur or nitrogen at one or more oxygen sites of the crown ether.

12. A method of making a lithium ion battery, comprising:

chemically bonding a chelating agent to a polymer particle, the chelating agent being selected from the group consisting of a crown ether, a podand, a lariat ether, a calixarene, a calixcrown, and combinations thereof;

incorporating the polymer particle having the chelating agent chemically bonded thereto into a membrane of a microporous polymer separator by dispersing the polymer particle throughout a main polymer of the membrane; and arranging the microporous polymer separator between the negative electrode and the positive electrode;

wherein the chelating agent complexes with metal cations of at least one of Mn, Co, Ni, or Fe in a manner sufficient to not affect movement of lithium ions across the microporous polymer separator during operation of the lithium ion battery.

13. The method as defined in claim 12 wherein the polymer to which the chelating agent is chemically bonded is chosen from polyethylene terephthalates, polyvinylidene fluorides, polyamides, polyurethanes, polycarbonates, polyesters, polyetheretherketones, polyethersulfones, polyimides, polyamide-imides, polyethers, polyoxymethylenes, polybutylene terephthalates, polyethylenenaphthenates, polybutenes, polyolefins, polyolefin copolymers, acrylonitrile-butadiene styrene copolymers, polystyrene copolymers, polymethylmethacrylates, polyvinyl chlorides, polysiloxane polymers, polybenzimidazoles, polybenzoxazoles, polyphenylenes, polyarylene ether ketones, polyperfluorocyclobutanes, polytetrafluoroethylenes, polyvinylidene fluoride copolymers, polyvinylidene fluoride terpolymers, polyvinylidene chlorides, polyvinylfluorides, liquid crystalline polymers, poly(hydroxybenzoic acid), polyaramides, polyphenylene oxides, or combinations thereof.

14. A lithium ion battery, comprising:
a positive electrode;
a negative electrode;
a polyethylene separator disposed between the negative electrode and the positive electrode; and
a layer of a polymer having a chelating agent chemically bonded thereto formed on a surface of the polyethylene separator, the polymer having the chelating agent chemically bonded being selected from the group consisting of (polyvinylbenzo-crown ether), poly((dibenzo-crown ether)-co-formaldehyde), poly(undecylenyl-oxymethyl-crown ether), and combinations thereof.

15. The lithium ion battery as defined in claim 14 wherein the crown ether is selected from the group consisting of 15-crown-5, an 18-crown-6, or a 21-crown-7.

* * * * *